(12) United States Patent
Miller et al.

(10) Patent No.: US 7,746,517 B2
(45) Date of Patent: Jun. 29, 2010

(54) IMAGE ILLUMINATION AND CAPTURE IN A SCANNING DEVICE

(75) Inventors: Mark Eric Miller, Versailles, KY (US); Anthony Michael King, Lexington, KY (US); Mahesan Chelvayohan, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 826 days.

(21) Appl. No.: 11/627,014

(22) Filed: Jan. 25, 2007

(65) Prior Publication Data

US 2008/0180754 A1    Jul. 31, 2008

(51) Int. Cl.
*H04N 1/04* (2006.01)
*F21V 7/04* (2006.01)

(52) U.S. Cl. .................. 358/474; 358/475; 358/484; 362/551

(58) Field of Classification Search .......... 358/507, 358/510, 511, 475, 481, 482, 484, 480, 474; 362/606, 609, 610, 611, 612, 613, 615, 620, 362/551, 559, 84; 359/227; 349/57, 62
See application file for complete search history.

(56) References Cited

U.S. PATENT DOCUMENTS

| | | | | |
|---|---|---|---|---|
| 4,638,987 A * | 1/1987 | Sakurai | ...................... | 271/111 |
| 4,715,597 A * | 12/1987 | Sakurai | ...................... | 271/122 |
| 6,608,961 B2 | 8/2003 | Travis | | |
| 6,883,919 B2 | 4/2005 | Travis | | |
| 7,253,799 B2 * | 8/2007 | Lee et al. | ..................... | 345/102 |
| 7,455,441 B2 * | 11/2008 | Chose et al. | ................. | 362/608 |
| 7,518,762 B2 * | 4/2009 | Budelsky et al. | ............. | 358/474 |
| 7,564,517 B2 * | 7/2009 | Daiku et al. | ................... | 349/62 |
| 2004/0046870 A1 | 3/2004 | Leigh Travis | | |
| 2004/0190280 A1 * | 9/2004 | Matsushita | .................... | 362/31 |
| 2004/0196665 A1 | 10/2004 | Travis | | |
| 2005/0030730 A1 * | 2/2005 | Ohkawa et al. | ............... | 362/31 |
| 2005/0141244 A1 * | 6/2005 | Hamada et al. | ............. | 362/612 |
| 2005/0180719 A1 * | 8/2005 | Hara et al. | ................... | 385/146 |
| 2006/0109681 A1 * | 5/2006 | Kim et al. | .................... | 362/606 |
| 2006/0132423 A1 | 6/2006 | Travis | | |
| 2006/0239030 A1 * | 10/2006 | Chen | .......................... | 362/606 |
| 2006/0268581 A1 * | 11/2006 | Hsu | ............................ | 362/633 |
| 2006/0274551 A1 * | 12/2006 | Takada | ....................... | 362/611 |
| 2007/0165422 A1 * | 7/2007 | Iwasaki | ....................... | 362/615 |
| 2007/0253218 A1 * | 11/2007 | Tanabe | ....................... | 362/612 |
| 2009/0080216 A1 * | 3/2009 | Tanabe | ....................... | 362/612 |

FOREIGN PATENT DOCUMENTS

JP        2000-048616       *   2/2000

* cited by examiner

*Primary Examiner*—Jerome Grant, II
(74) *Attorney, Agent, or Firm*—David Kalish; John Victor Pezdek

(57) ABSTRACT

Scanning devices and method of use that permit the capture of high resolution images of an original that is illuminated by a light source that is located outside of the optical field of view of an image detector. In one aspect, the image detector may be a monochrome sensor that sequentially captures different color plane images of an original that is illuminated by different colors. The different color plane images may be processed to generate a full color copy of the original. Light and images may be directed through tapered optical waveguides to minimize the volume of the scanning device. The image detector may include a first associated waveguide while the light source may include a second associated waveguide.

14 Claims, 10 Drawing Sheets

IMAGE ILLUMINATION AND CAPTURE IN A SCANNING DEVICE

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC

None.

BACKGROUND

1. Field of the Invention

The present invention relates generally to scanners and scanning methods, and more particularly to those permitting the capture of high resolution images of an original that is illuminated by a light source that is located outside of the optical field of view of an image detector.

2. Description of the Related Art

Scanning devices are used in a variety of applications. Scanning devices may be combined in an all-in-one unit that includes scanning, printing, and facsimile function. Scanning devices may also be independent and only capable of scanning documents. Historically, scanning devices include a drive mechanism that moves a scan bar across a target document. Each line of the document is individually scanned and the data is downloaded to a processor. This data is combined together to form a final two dimensional image of the document. These scanning devices require precise movement of the scan bar to prevent registration defects. Quality scans require intricate mechanisms which are often costly and complex.

Scanning devices, either of the all-in-one or independent variety, are popular for both business and personal use. Ideally, the devices are designed to have a smaller size that enables placement within small workspaces such as desk tops and bookshelves. As a result, size is often an important aspect when deciding to purchase a scanning device. Smaller devices are usually more accepted because of the ability to fit where needed and occupy a minimum space. Along with size, the price of the device is another important aspect during purchase. A device meeting other requirements may not be acceptable because of an higher price.

Digital photography technology has progressed with imaging units now able to produce high quality two dimensional images in a single capture step. Image sensors including millions of light sensors are readily available. The imaging units are also economical allowing them to be utilized in new applications, such as document scanning technology. The imaging unit includes a substantial field of view that is visible by the image sensor. Thus, the imaging unit is able to capture most or all of a document original. Unfortunately, the relatively large field of view creates space and illumination complications. The image sensor may include a relatively large focal length. Further, stray reflections may be prone to enter the field of view and reach the sensor. Accordingly, scan devices incorporating these types of imaging units should accommodate these problems.

SUMMARY

The present application is directed to embodiments of scanning devices and method of use that permit the capture of high resolution images of an original that is illuminated by a light source that is located outside of the optical field of view of an image detector. The light source may include individually selectable colors, such as red, green, and blue LEDs. In one aspect, the image detector may be a monochrome sensor that sequentially captures different color plane images of an original that is illuminated by different colors. The different color plane images may be processed to generate a full color copy of the original. Light and images may be directed through tapered optical waveguides to minimize the volume of the scanning device. The image detector may include a first associated waveguide while the light source may include a second associated waveguide. In one embodiment, the first waveguide may be disposed between the second waveguide and a scan bed on which the original is positioned.

DETAILED DESCRIPTION

The present application discloses embodiments for using an imaging unit within a scanning device. The scanning device includes an imaging unit and a target bed for placement of the target document. The scanning device may include an illumination system that limits an amount of stray light that reaches an image sensor. Further, the scanning device may include a compact optics package that accommodates image sensors with lengthy focal lengths in a relatively small volume.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

Figure 1:
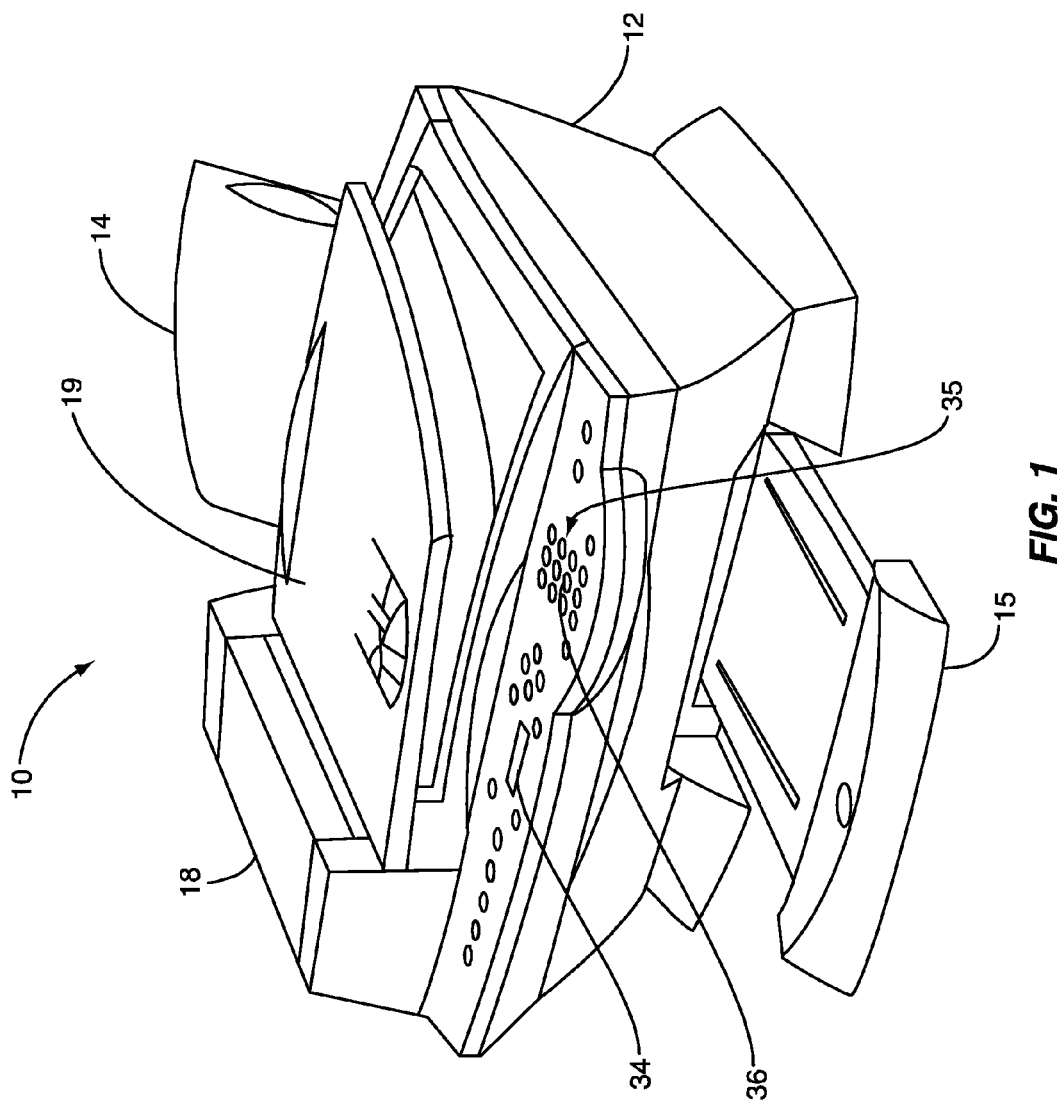
FIG. 1 is perspective view of a scanning device according to one embodiment of the present invention.

One embodiment of a scanning device is illustrated in FIG. 1 and indicated generally by the numeral 10. This embodiment features both scanning and printing capabilities. Scanning device 10 comprises an exterior housing 12, a user interface 35, an imaging unit (not visible in FIG. 1), at least one media input tray 14 adapted to hold a stack of print media, a media output tray 15, and a document handler 18. In one embodiment, the document handler 18 is integrated into a cover 19 that may be lifted to expose a target bed (not visible in FIG. 1) on which individual target documents may be placed for subsequent scanning. Additional internal components for performing functions of printing and scanning are not visible in the exterior view illustrated in FIG. 1.

Figure 2:
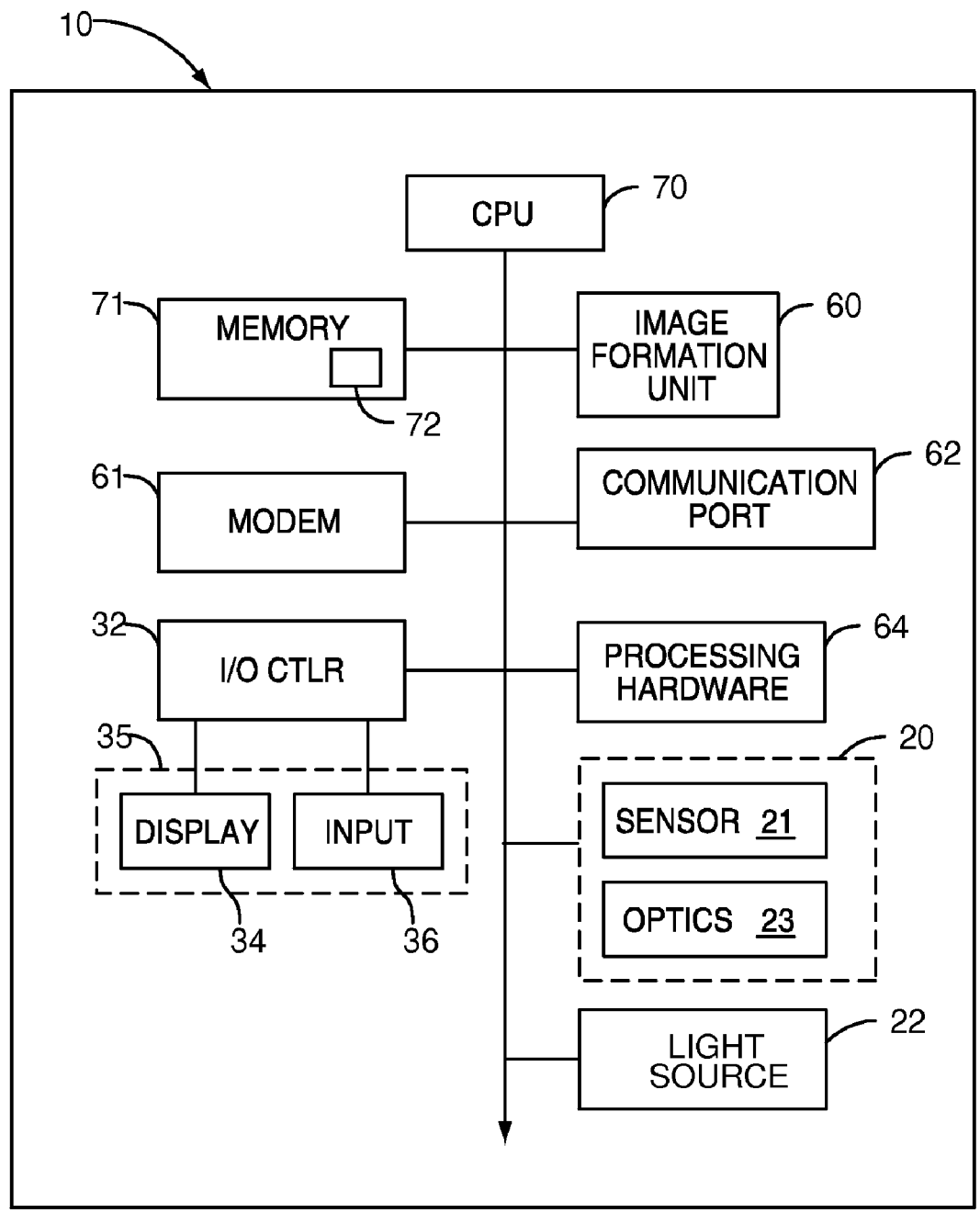
FIG. 2 is a block diagram of a scanning device according to one embodiment of the present invention.

FIG. 2 provides a simplified representation of some of the various functional components of the device 10 of FIG. 1. For instance, the device 10 includes an imaging unit 20 as well as a printing unit 60, which may itself include a conventionally known ink jet or laser printer with a suitable document transport mechanism. Interaction at the user interface 35 is controlled with the aid of an I/O controller 32. Thus, the I/O controller 32 generates user-readable graphics at a display 34 and interprets commands entered at a keypad 36.

The device 10 may also include one or more processors 70, system memory 71, which generically encompasses RAM and/or ROM for system operation and code storage as represented by numeral 72. The system memory 71 may suitably comprise a variety of devices known to those skilled in the art such as SDRAM, DDRAM, EEPROM, Flash Memory, and perhaps a fixed hard drive. Those skilled in the art will appreciate and comprehend the advantages and disadvantages of the various memory types for a given application.

Additionally, the device 10 may include dedicated image processing hardware 64, which may be a separate hardware circuit, or may be included as part of other processing hardware. For example, control of the imaging unit 20 and of subsequent image processing may be implemented via stored program instructions for execution by one or more Digital Signal Processors (DSPs), ASICs or other digital processing circuits included in the processing hardware 64. Alternatively, stored program code 72 may be stored in memory 71, with the control techniques described herein executed by some combination of processor 70 and processing hardware 64, which may include programmed logic devices such as PLDs and FPGAs.

FIG. 2 also illustrates the imaging unit 20 including a sensor 21 and optics 23. A light source 22 is also included to provide adequate uniform illumination for the original target document. Exemplary types of sensors 21 may include CCD and CMOS sensors. Multilayer direct image sensors may also be used. The optics 23 may comprise different types of elements, such as some combination of mirrors, prisms, lenses, and beam splitters. The optical lenses may be wide angle or telephoto lenses adapted to focus an image of an original document onto the sensor 21 with minimum distortion or other optical aberrations. Other types of lenses may be used where appropriate.

Image sensors 21 that can be used include digital CMOS imaging modules, typically used in digital cameras, that currently are available in various megapixels (MP) sizes and are available from manufacturers such as Micron Technology, Inc., 8000 S. Federal Way, P.O. Box 6, Boise, Id. 83707-0006 or Omnivision Technologies, Inc., 1341 Orleans Drive, Sunnyvale, Calif. 94089. As shown, these imaging modules will have equivalent scan resolutions for 8.5×11 inch scanner and 4×6 inch scanner (typically used for scanning photographs) as summarized in Table 1.

TABLE 1

| Imaging Sensor Size (MP) (4:3 aspect ratio) | 8.5 × 11 Scanner Equivalent Resolution (ppi) | 4 × 6 Scanner Equivalent Resolution (ppi) |
| --- | --- | --- |
| 1 | 102 | 192 |
| 2 | 144 | 272 |
| 3 | 176 | 333 |
| 4 | 204 | 385 |
| 5 | 228 | 430 |
| 6 | 250 | 471 |
| 7 | 270 | 509 |
| 8 | 288 | 544 |
| 9 | 306 | 577 |
| 10 | 322 | 609 |

The table illustrates that for a 200 pixel per inch resolution, a 4×6 inch photo scanner can be designed with a 1 MP digital imaging sensor while an 8.5×11 inch scanner can use a 4 MP digital imaging sensor.

Figure 3:
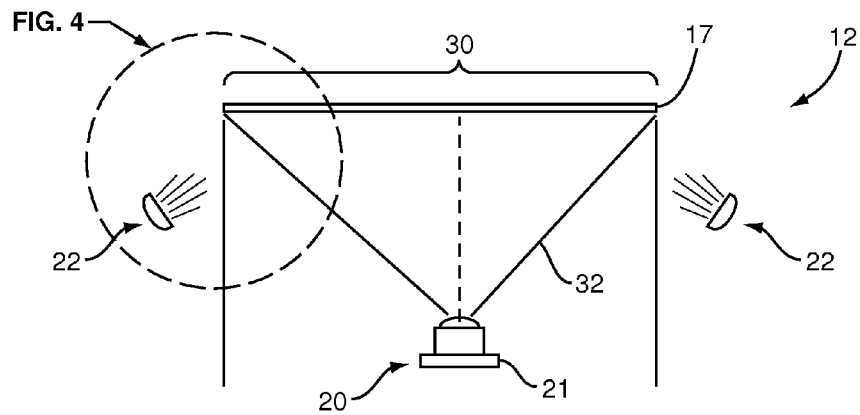
FIG. 3 is a schematic view of a scanning device illustrating a light source disposed outside of an sensor field of view according to one embodiment of the present invention.

FIG. 3 illustrates one embodiment of an imaging unit 20 disposed within a scan device body 12 and configured to capture a digital representation of an original image positioned on a scan bed 17. The imaging unit 20 includes a two-dimensional array of sensors 21 that "see" an image area 30 on the scan bed 17. The sensors 21 in the imaging unit 20 include a field of view 32 that corresponds to the image area 30. Thus, the image area 30 extends in a direction substantially perpendicular to the page in the orientation shown in FIG. 3. The illumination of a document or object on the scan bed 17 needs to be done such that the image sensor 21 only sees a desired object or image. The light source 22 should be positioned so it does not become a part of the image that is being captured. Further, reflections from the illumination sources 22 and secondary reflections off the imaging unit 20 housing/lenses should be minimized. As part of the process of capturing digital representations of an image on the scan bed 17, intensity, uniformity, and reflections should also be addressed in the illumination system. To prevent the light source 22 from appearing as a reflection in the image, the light source 22 is located outside of the field of view 32 of the document, as shown in FIG. 3.

Figure 4:
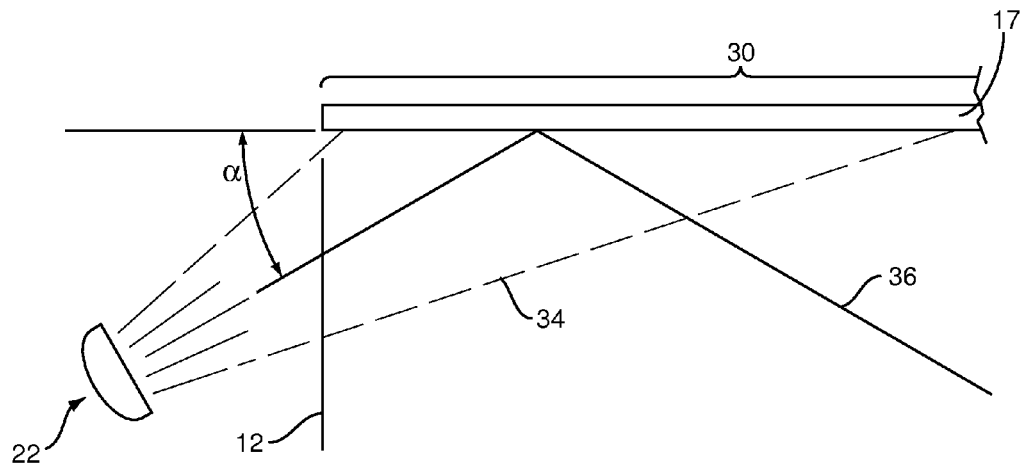
FIG. 4 is a schematic view of a scanning device illustrating a light source disposed at an acute angle relative to a scan bed according to one embodiment of the present invention.

The detail view provided in FIG. 4 shows that the light source 22 projects light at an acute angle α to the scan bed 17. This directs reflected specular light 36 to the opposite side of the device body 12 and does not reach the imaging unit 20. Meanwhile, diffuse light 34 projects over a region of the image area 30. Notably, the angle $\alpha$ of reflection also affects the illumination intensity. At too shallow of an angle $\alpha$, the intensity may suffer while at too steep of an angle $\alpha$, unwanted reflections may increase. In one embodiment, an angle $\alpha$ of between about 15 and about 45 degrees may be appropriate though other angles may be suitable for a given device 10 and imaging unit 20 geometry.

The imaging unit 20 may include a color image sensor 21 or a monochrome sensor 21. In certain implementations, systems using a color camera chip are adversely affected by the color masking that is typically used on the sensor 21 chip to produce the full color image. Those skilled in the art will recognize that color camera chips are often masked with red, green, and blue colors in a Bayer pattern. The Bayer pattern is designed to replicate how the human eye sees color. The colors are distributed as 25% red, 25% blue, and 50% green. When using the camera chip for document scanning, the premasked pattern results in a loss of resolution.

A single pixel in an image sensor 21 can yield only intensity information about the light wavelengths that fall on it. Many color imaging units 20 determine pixel color with a Bayer filter or other filters and interpolation from the intensity values of neighboring pixels. This interpolation inevitably reduces resolution. Further, the arrangement of blue and red pixel sites in a Bayer filter makes a single-imager color camera prone to horizontal and vertical artifacts, especially on objects with straight edges that follow a row or column (common occurrences in document scanning). The Bayer pattern may also cause artifacts at higher spatial frequencies. To obtain higher resolutions needed to scan a document, it is desirable to use every sensor 21 on the imaging unit 20.

Figure 5A:
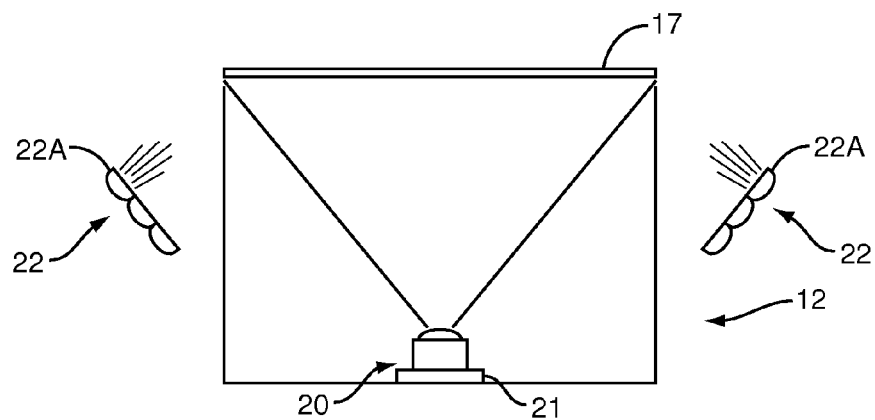
FIGS. 5A-C are schematic views of a scanning device depicting a sequence by which a scan bed is illuminated by different colors according to one embodiment of the present invention.
Figure 5B:
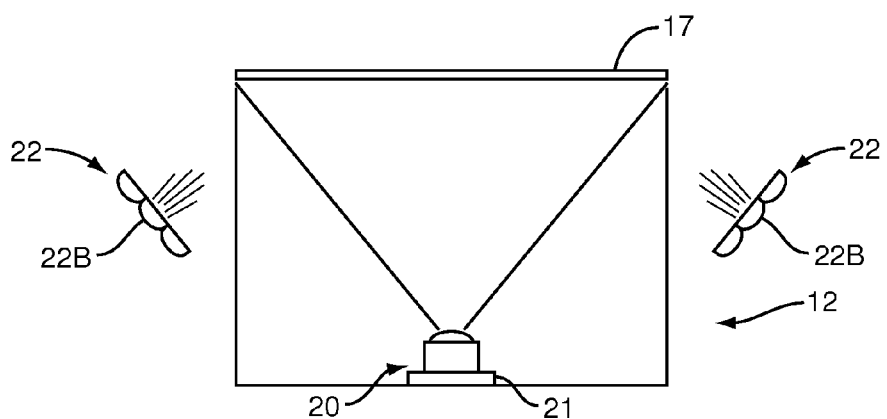
Figure 5C:
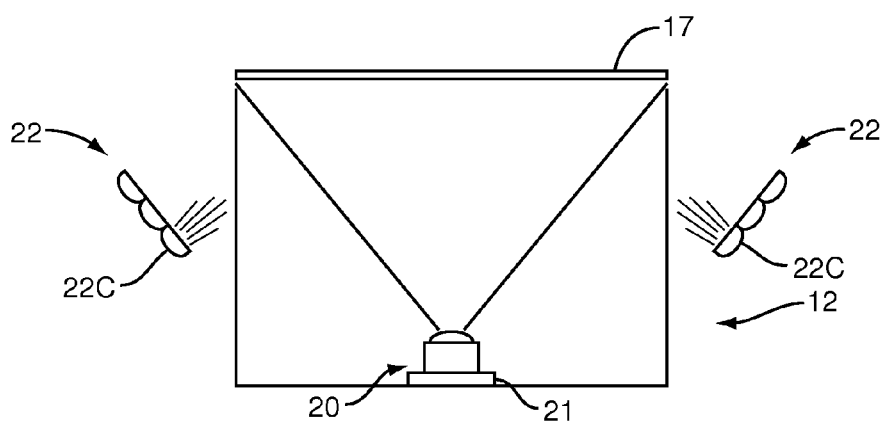
Figure 6:
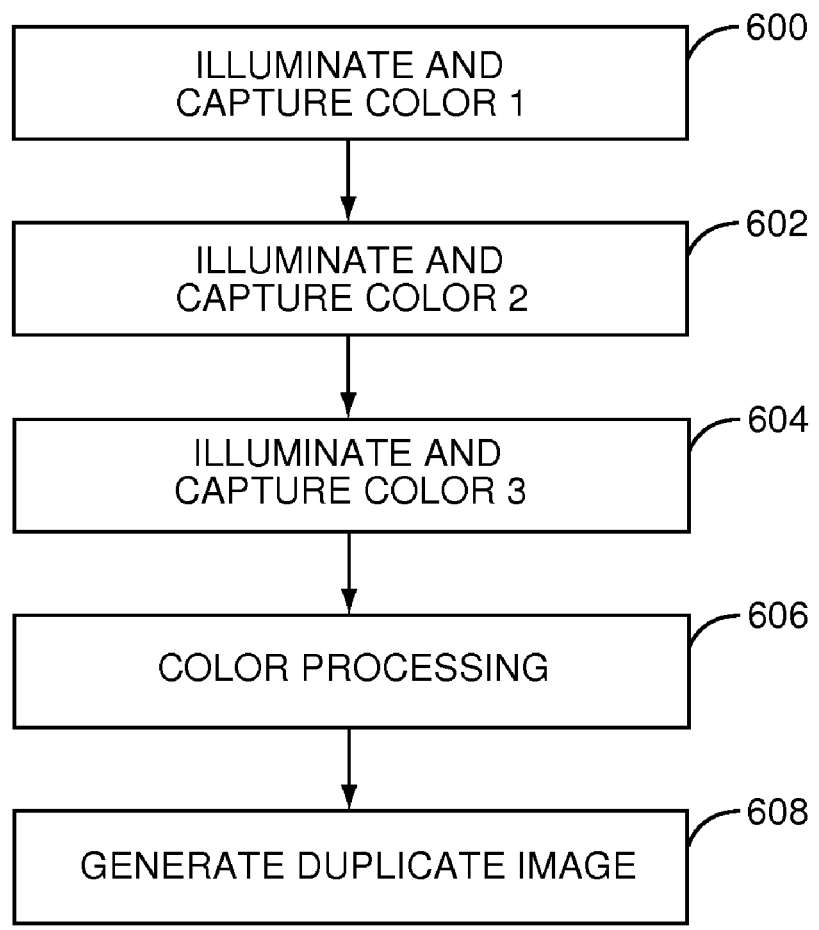
FIG. 6 is a flow diagram depicting processing steps by which an original is illuminated and captured with different colors and processed to generate a duplicate according to one embodiment of the present invention.

To alleviate some of these problems, the device 10 may incorporate a monochrome sensor 21 with sequential color illumination. The monochrome sensor 21 may distinguish between many shades of gray, ranging from white to black. Different grayscale depths are known, including for example, an 8-bit (256 shades) or greater sensor 21 may be used. To generate a color image, the monochrome sensor 21 may be used in conjunction with sequential RGB illumination. FIGS. 5A-C show that an original positioned onto the scan bed 17 document is exposed to different colors in sequence and sampled using the monochrome full sensor 21 array in the imaging unit 20. FIG. 6 also depicts exemplary processing steps used in capturing separate color images and merging those images to obtain a full color duplicate. Specifically, in FIG. 5A and at step 600, a first color source 22A illuminates the original and the imaging unit 20 captures a first image. The monochrome imaging unit 20 does not detect the color (e.g., hue, saturation, or chroma values). Instead, the imaging unit 20 captures an array of intensities detected through illumination of the scan bed 17 by the first color source 22A. In FIG. 5B and at step 602, a second color source 22B illuminates the original and the imaging unit 20 captures a second image. Next, in FIG. 5C and at step 604, a third color source 22C illuminates the original and the imaging unit 20 captures a third image. The first 22A, second 22B, and third 22C color sources may comprise red, green, and blue LEDs. The light source 22 may be provided through other types of illumination sources, including incandescent, fluorescent, fiber optics, or other light sources. Further, the order of color illumination may change as desired.

At step 606, color processing may be implemented to the individual images corresponding to each color or to a merged full color image. Since each color plane is individually captured, the exposure, gain, gamma correction, illumination, filtering, calibration, and color table for each color can be independently controlled for better color fidelity. Further, since there are no moving parts in the system, motion errors are substantially eliminated. Since, each color plane is captured by the same pixels each time, the color planes may be merged at step 608 to form a single, full color duplicate digital image of the image positioned on the scan bed 17. In one embodiment, the pixel intensities from the three image arrays are used as input values into a color table that may be stored in memory 71. The color table may include corresponding color information needed to construct a full color image, resulting in a true color image that is at full resolution (i.e., using substantially most or all pixels of the monochrome imaging unit).

In one embodiment, a 3.1 megapixel or higher imaging unit 20 is used. The array size for a conventional 3 megapixel sensor 21 is 2048×1536 pixels, which reflects an aspect ratio of 4:3. One standard size sheet of paper has an aspect ratio of 11:8.5 (or 4:3.091). Since the ratios are different, some pixels are lost or unused when capturing an 8.5"×11" image. Using the aspect ratio of a piece of paper, the pixel count that matches up with the camera sensor 21 would be 1988×1536 or 3053568 pixels. This total represents a loss of 60×1536 or 92,160 pixels. When translated to pixels per inch, the entire 8.5"×11" image is captured at 180.7 pixels per inch in the X and Y axis.

Figure 7:
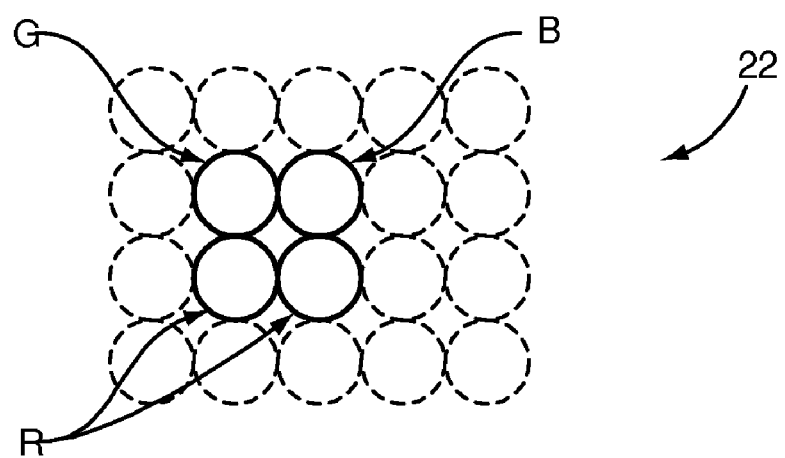
FIG. 7 is a schematic view of a light source including an array of red, green, and blue sources according to one embodiment of the present invention.

In one embodiment, the light source 22 includes red, green, and blue LEDs to illuminate the document (or object) on the flat bed 17. The LEDs should be positioned in close proximity to illuminate the image with the same uniformity for each color. Thus, the light source 22 may include an array of individual LEDs, each being a different color as shown in FIG. 7. In one embodiment, the LED's include red, green, and blue LEDs. In one embodiment, the additional red LEDs are included in the array to increase the luminance for the red channel. Additional red LEDs may be needed due to a reduced sensitivity of the imaging sensors 21 in the spectrum of the red LEDs. Accordingly, the additional red LEDs may provide the needed additional luminance. In one embodiment, the image sensor may include about twice as many red LEDs as blue or green LEDs. In one embodiment, groups of two red LEDs are positioned adjacent each other, with the two adjacent red LEDs interspersed among green and blue LEDs.

Figure 8:
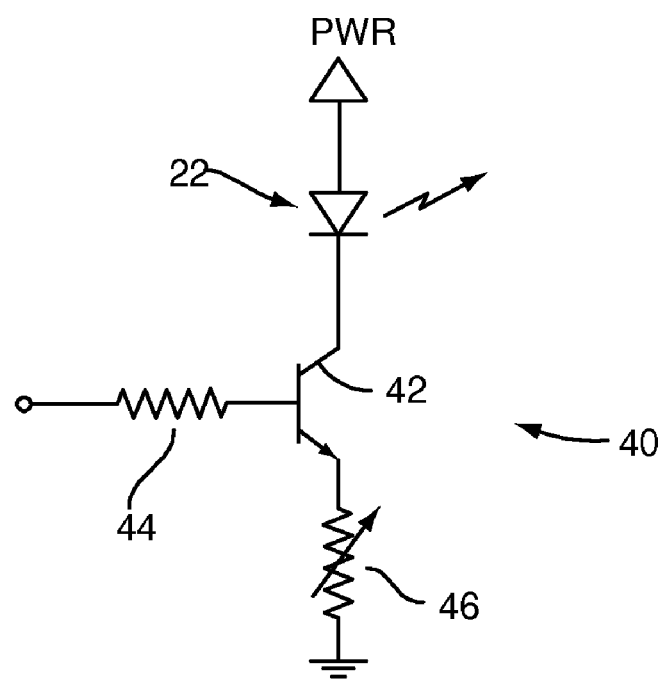
FIG. 8 is a schematic view of a light source intensity control circuit according to one embodiment of the present invention.

FIG. 8 depicts a complementary or alternative approach that may be used to adjust the intensity of individual LED colors. Specifically, the control circuit 40 may provide additional intensity or luminance for a given color. The exemplary control circuit 40 includes a simple switching transistor including a turn-on resistor 44 at the transistor 42 gate. An LED 22 is disposed in line between a power source PWR and the collector of transistor 42 and a variable resistor 46 is disposed between the emitter of transistor 42 and ground. When the transistor 42 is turned on, current flows through the transistor 42 and the variable resistor 46 determines the voltage that appears at the LED. Thus, the variable resistor 46 is adjustable to vary the intensity output by the LED 22. With this simple control circuit 40, the control of each color is independent and allows for individual adjustment. It is comtemplated that the adjustment could be done automatically using circuitry and/or program instructions provided in device 10. Adjustment may also be implemented as a function of LED position as much as LED color.

Figure 9:
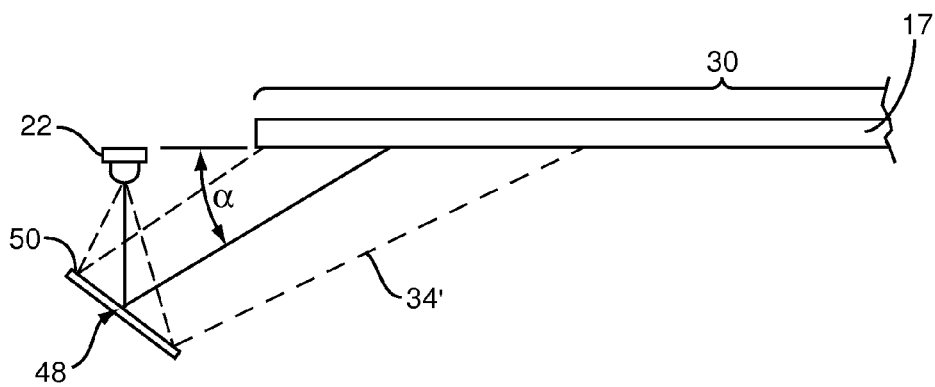
FIG. 9 is a schematic view of a scanning device illustrating a light source disposed at an acute angle relative to a scan bed according to one embodiment of the present invention.

FIG. 9 shows one embodiment of a light source 22 used in conjunction with a reflector. In some instances, the length of the light path may consume a considerable amount of space. To reduce the area needed for illumination, a reflector 48 may be used to fold the light path and increase space efficiency.

One purpose of the reflector 48 is to redirect the light towards the scan bed 17. Thus, the reflector 48 may include a polished, mirrored reflection surface 50. In one embodiment, the reflection surface may be configured to aid in the scattering of the light to produce a more uniform distribution of light at the scan bed 17. Accordingly, the reflection surface 50 may include a frosted, textured or white surface resulting in various amounts of diffusion at the expense of reducing the intensity of the reflected light. In general, the reflector 48 offers a smaller size and allows flexibility of diffusion materials, reflection angles, and light path. As described above and shown in FIG. 4, the reflector 48 should project light towards the scan bed 17 at an acute angle α. Notably, the diffuse light 34' from the reflection surface 50 may project over a larger portion of the image area 30 as compared to the embodiment shown in FIGS. 3 and 4.

Figure 10:
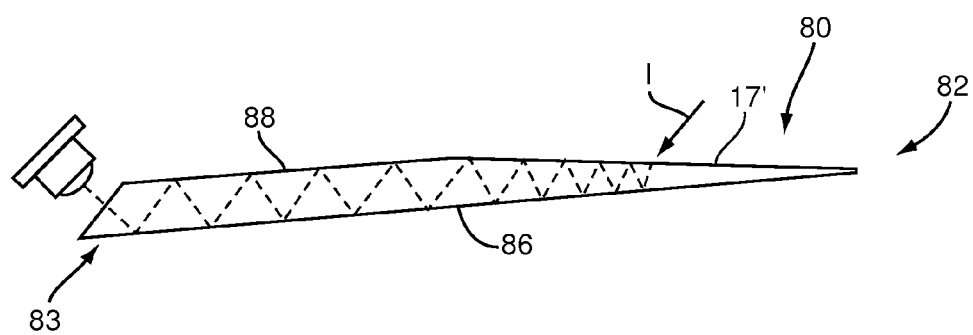
FIG. 10 is a schematic view of a tapered waveguide used in capturing an image according to one embodiment of the present invention.

Additional space conservation for the light source 22 and the imaging unit 20 may be achieved through the use a tapered optical waveguide 80 as shown in FIG. 10. A tapered optical waveguide device as described in US Patent Application Publication 2004/0046870, incorporated by reference herein, is an apparatus in the form of a slab. Light from an image can be injected into a tapered surface, which in this case may form a scan bed 17', at a thin end 82 of the slab and then exits at the opposite thick end 83. The tapered scan bed 17' is oriented such that light near the critical angle for the refractive index of the waveguide 80 material enters the waveguide 80 and reflects internally along the slab towards the thick end 83. With this configuration, an original image (e.g., document or photo) is positioned on the scan bed 17' at one end 82 of the waveguide 80, and the imaging unit 20 is present at the opposite end 83. The focal length of the imaging unit 20 is measured through the optical waveguide 80. One advantage of this method is that the space normally required to capture images with an imaging unit 20 through air, is now contained within the waveguide 80. At the thick end 83, of the waveguide 80, the slab extends for a length with parallel opposing faces 86, 88. The thickness between these faces 86, 88 of the waveguide 80 is a function of the optical properties of the imaging unit 20.

Figure 11:
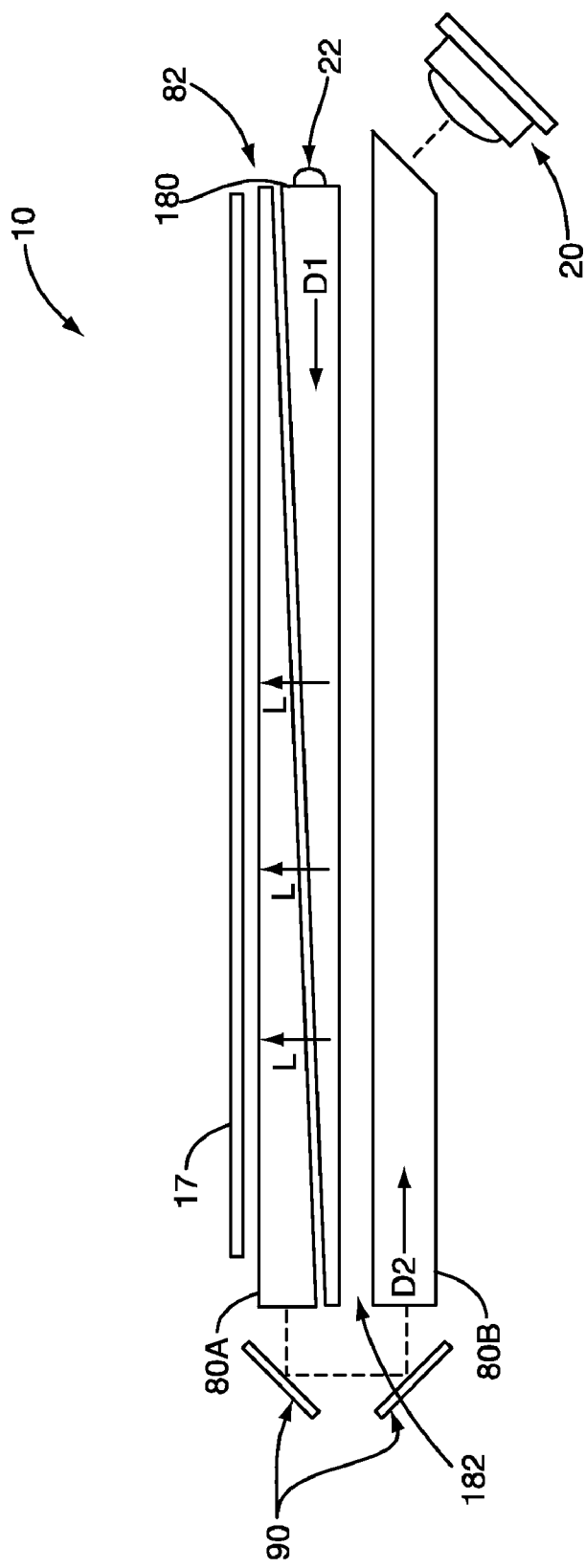
FIG. 11 is a schematic view of a scanning device illustrating separate tapered waveguides for a light source and an imaging unit according to one embodiment of the present invention.
Figure 13:
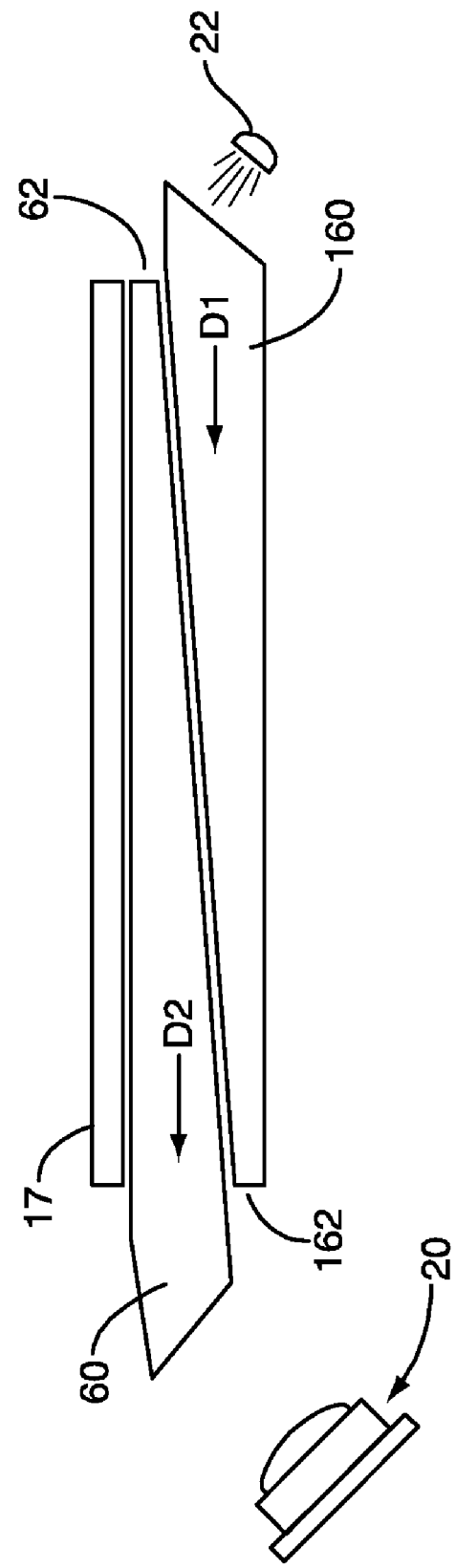
FIG. 13 is a schematic view of a scanning device illustrating separate tapered waveguides for a light source and an imaging unit according to one embodiment of the present invention.

Notably, light may travel in both directions through waveguides 80 of this type. Accordingly, the scanning device 10 may incorporate a tapered waveguide 80 to both illuminate an original with a light source 22 and capture a digital image with an imaging unit 20. FIG. 11 illustrates one exemplary embodiment of a scanning device 10 that includes a waveguide 80 associated with each of the imaging unit 20 and the light source 22. In the embodiment shown, the imaging unit 20 includes a waveguide 80A, 80B that is split into separate elements. An upper portion of the waveguide 80A includes a tapered geometry as described above. A lower portion of the waveguide 80B includes a substantially constant thickness. In essence, the split waveguide 80A, 80B is substantially similar to the slab 80 shown in FIG. 10, with the waveguide 80A, 80B folded in half. The internally reflected light is folded 180 degrees by reflectors 90. The reflectors 90 may be implemented using mirrors, a prism, or other reflecting surfaces. A second waveguide 180 associated with the light source 22 is disposed between the folded halves of the waveguide 80A, 80B associated with the imaging unit 20. Further, the thin ends 82, 182 of these waveguides 80A-B, 180 face substantially opposite directions so as to minimize the height of the device 10. In the embodiment shown, the light source 22 and imaging unit 20 are disposed on the same side of the waveguides 80A, 80B, 180. However, in other embodiments, such as where the imaging unit 20 uses a waveguide 80 that is not bent (such as in FIG. 13), the light source 22 and imaging unit 20 may be disposed on opposite sides of the waveguides 80, 180. In either case, light from light source 22 propagates towards the scan bed 17 from a first direction D1 while the captured image propagates from the scan bed 17 towards the imaging unit 20 along an opposite second direction D2.

Light projected by the light source 22 travels down its associated waveguide 180 and escapes beneath the waveguide 80A associated with the imaging unit. This light from the light source 22 passes through the waveguide 80A to illuminate the scan bed 17 as indicated by the vertical arrows L. Then, light reflected from the target image on the illuminated scan bed 17 will enter the tapered upper portion of the waveguide 80A, pass around the reflectors 90, through the lower portion of the waveguide 80B and ultimately reach the imaging unit 20. These waveguides 80, 80A, 80B, 180 may be used with monochrome or color imaging units 20.

Figure 12:
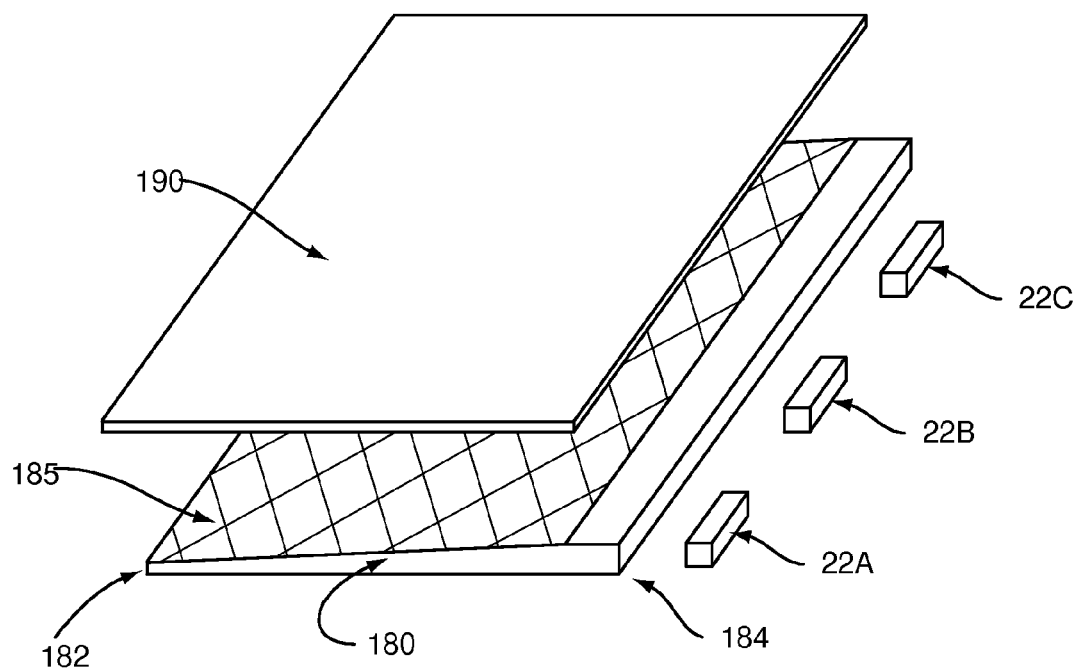
FIG. 12 is a schematic view of a tapered waveguide used with a light source according to one embodiment of the present invention.

Light projected by the light source 22 may be further modified as shown in FIG. 12. The waveguide 180 may include a diffusion surface 185 at the tapered surface where light exits the waveguide 180. That is, the diffusion surface 185 is disposed at the surface where the slab tapers from the thick end 184 to the thin end 182. The waveguide 180 may also include an associated redirecting film 190 that bends the light emitted from the waveguide 180 in the direction of the scan bed 17 as shown by the arrows L in FIG. 11. The redirecting film 190 may be constructed as a prismatic film as disclosed in US Patent Application Publication 2006/0132423, the contents of which are incorporated by reference herein. The result of the diffusion surface 185 and redirecting film 190 is a uniform distribution of light over a large area but within a small volume. In different embodiments, the waveguide 180 may include one or both or neither of the diffusion surface 185 and redirecting film 190.

As suggested above, the exemplary device 10 shown in FIGS. 1 and 2 may include other components and other functionality. Certain copy or scan functions may be initiated at a user display 35, including a display 34. The display 34 may be embodied as an alphanumeric or graphical LCD display and keypad 36 may be an alphanumeric keypad. Alternatively, the display and input functions may be implemented with a composite touch screen (not shown) that simultaneously displays relevant information, including images, while accepting user input commands by finger touch or with the use of a stylus pen (not shown).

The exemplary embodiment of the device 10 also includes a modem 61, which may be a fax modem compliant with commonly used ITU and CCITT compression and communication standards such as the V.XX and Class 1-4 standards known by those skilled in the art. The device 10 may also be coupled to a computer or computer network (not shown) through a compatible communication port 62, which may comprise a standard parallel printer port, a serial data interface such as USB 1.1, USB 2.0, IEEE-1394 (including, but not limited to 1394a and 1394b) and the like.

Device 10 may also include integrated wired or wireless network interfaces. Therefore, communication port 62 may also represent a network interface, which permits operation of the device 10 as a stand-alone device. A wired communication port 62 may comprise a conventionally known RJ-45 connector for connection to a 10/100 LAN or a 1/10 Gigabit Ethernet network. The wireless communication port 62 may comprise an adapter capable of wireless communications with other devices in a peer mode or with a wireless network in an infrastructure mode. Accordingly, the wireless communication port 62 may comprise an adapter conforming to wireless communication standards such as Bluetooth®, the various 802.11 standards, 802.15 or other standards known to those skilled in the art.

The present invention may be carried out in other specific ways than those herein set forth without departing from the scope and essential characteristics of the invention. For instance, much of the discussion provided herein has discussed the used of a monochrome image sensor that captures multiple color plane images. It should be noted however, that in the context of the waveguide light systems, the waveguides 80, 80A, 80B, 180 may be used with monochrome or color imaging units 20. The present embodiments are, therefore, to be considered in all respects as illustrative and not restrictive, and all changes coming within the meaning and equivalency range of the appended claims are intended to be embraced therein.

What is claimed is:

1. A scanning device comprising:
    a target bed;
    an imaging unit operative to capture an image of a document placed on the target bed;
    a light source operative to illuminate the document placed on the target bed;
    a tapered first slab waveguide configured to receive the image of the document into a first tapered face of the first slab, the image propagating through the waveguide from the first tapered face to a first thick end of the first slab after internal reflection within the first slab, the imaging unit disposed to receive the image as it emerges from the first thick end of the first slab; and
    a tapered second slab waveguide configured to receive light from the light source into a second thick end of the second slab, the light propagating through the waveguide from the second thick end of the second slab and emerging from a second tapered face of the second slab after internal reflection within the second slab, light from the light source transversely passing through the first slab to illuminate the document placed on the target bed.

2. The device of claim 1, wherein the light source comprises an array of red, green, and blue light sources.

3. The device of claim 1, wherein the first slab and second slab are oriented so that the first thick end faces a substantially opposite direction from the second thick end.

4. The device of claim 1, wherein the first slab waveguide includes a folded first portion and second portion with a reflector disposed therebetween to fold the image from the first portion to the second portion, the first portion including the first tapered face, and the imaging unit disposed to receive the image as it emerges from the second portion.

5. The device of claim 4, the second slab waveguide is disposed between the first and second portions of the first slab waveguide.

6. The device of claim 1, wherein the second slab waveguide includes a diffuse second tapered face.

7. The device of claim 1, further comprising a redirection element disposed at the second tapered face to redirect light towards the document placed on the target bed.

8. The device of claim 1, wherein the light source and imaging unit are disposed on the same side of the first and second slab waveguides.

9. The device of claim 1, wherein the light source and imaging unit are disposed on opposite sides of the first and second slab waveguides.

10. A method of scanning an image of a document with a scanning device, the method comprising the steps of:
    positioning the document on a target bed;
    illuminating the document using a light source and a tapered first waveguide, the light from the light source propagating through the tapered first waveguide;
    capturing an image of the document by propagating the image of the document through a tapered second waveguide and towards an imaging unit; and
    causing the light from the light source to exit from a tapered surface of the first waveguide and transversely pass through the second waveguide, which is disposed between the first waveguide and the target bed.

11. The method of claim 10, wherein the step of illuminating the document using the light source and the tapered first waveguide comprises propagating the light along a first direction and the step of propagating the image of the document through the tapered second waveguide comprises propagating the image along a second opposite direction.

12. The method of claim 10, wherein the step of illuminating the document using the light source comprises sequentially illuminating the document with different colors.

13. The method of claim 12, wherein the different colors comprise red, green, and blue.

14. The method of claim 10, wherein the step of illuminating the document using the light source comprises redirecting the light between the tapered surface of the first waveguide and the target bed.

* * * * *